United States Patent
Erdal et al.

(10) Patent No.: US 8,306,063 B2
(45) Date of Patent: Nov. 6, 2012

(54) REAL-TIME TRANSPORT PROTOCOL STREAM DETECTION SYSTEM AND METHOD

(75) Inventors: Muhammet Erdal, Westford, MA (US); Kaynam Hedayat, Chestnut Hill, MA (US)

(73) Assignee: EXFO Services Assurance, Inc., Chelmsford, MA (US)

(*) Notice: Subject to any disclaimer, the term of this patent is extended or adjusted under 35 U.S.C. 154(b) by 1244 days.

(21) Appl. No.: 11/511,924

(22) Filed: Aug. 29, 2006

(65) Prior Publication Data
US 2008/0056302 A1    Mar. 6, 2008

(51) Int. Cl.
*H04J 3/24* (2006.01)

(52) U.S. Cl. .................................................. 370/474

(58) Field of Classification Search .................. 370/474, 370/392, 230
See application file for complete search history.

(56) References Cited

U.S. PATENT DOCUMENTS

| | | | |
|---|---|---|---|
| 6,363,429 B1 * | 3/2002 | Ketcham | 709/235 |
| 6,452,915 B1 * | 9/2002 | Jorgensen | 370/338 |
| 6,615,173 B1 * | 9/2003 | Celi, Jr. | 704/260 |
| 6,765,904 B1 * | 7/2004 | Anandakumar et al. | 370/389 |
| 6,775,265 B1 | 8/2004 | Oran | |
| 7,061,936 B2 | 6/2006 | Yoshimura et al. | |
| 7,088,732 B2 * | 8/2006 | Min | 370/428 |
| 7,131,048 B2 | 10/2006 | Suzuki et al. | |
| 7,272,153 B2 * | 9/2007 | Cline | 370/466 |
| 7,447,164 B2 * | 11/2008 | Ueda et al. | 370/252 |
| 2001/0022785 A1 * | 9/2001 | Pessi | 370/352 |
| 2003/0088421 A1 | 5/2003 | Maes et al. | |
| 2003/0095567 A1 * | 5/2003 | Lo et al. | 370/466 |
| 2003/0107991 A1 | 6/2003 | Tezuka et al. | |
| 2004/0213152 A1 * | 10/2004 | Matuoka et al. | 370/230 |
| 2005/0047422 A1 | 3/2005 | Chen et al. | |
| 2005/0198391 A1 | 9/2005 | Coldren | |
| 2005/0243872 A1 | 11/2005 | Monai | |
| 2006/0083220 A1 | 4/2006 | Mekala et al. | |
| 2007/0189327 A1 | 8/2007 | Konda | |
| 2007/0206580 A1 | 9/2007 | Silver et al. | |
| 2007/0220171 A1 * | 9/2007 | Iwamura | 709/248 |
| 2007/0242670 A1 | 10/2007 | Simonson et al. | |

* cited by examiner

*Primary Examiner* — Mark Rinehart
*Assistant Examiner* — Mohammad Anwar
(74) *Attorney, Agent, or Firm* — Pierce Atwood LLP; Joseph M. Maraia (57) ABSTRACT

A system and method for identifying UDP packets on an IP network as candidates for characterization as packets of a RTP stream. UDP packets are identified at a point on the IP network, and for each identified UDP packet 1) it is determined if a version number in a RTP header field in the payload of the UDP packet equals a predetermined value, 2) determined if a packet length associated with the UDP packet is within a predetermined range, 3) determined if a payload type RTP header field within the payload of the UDP packet is within a predetermined range. If all the criteria are satisfied, then the identified UDP packet is characterized as a candidate RTP packet. It is then determined if the candidate RTP packet belongs to a previously detected RTP stream, or to a newly encountered RTP stream. A stream data store is then updated using the information in the RTP header of the candidate RTP packet.

22 Claims, 4 Drawing Sheets

Encapsulation of data in a UDP datagram inside an IP packet. The UDP data can further include a RTP packet header and RTP data.

FIGURE 4

REAL-TIME TRANSPORT PROTOCOL STREAM DETECTION SYSTEM AND METHOD

FIELD OF THE INVENTION

The present invention relates to communications over a network, such as the Internet, and more particularly to systems and methods for detecting real-time transport protocol (RTP) streams within a network.

BACKGROUND

RTP provides end-to-end network transport functions suitable for applications transmitting real-time data, such as audio, or video data, over multicast or unicast network services. RTP is designed to be independent of the underlying transport and network layers. Accordingly, RTP does not address congestion control, resource reservation, and does not guarantee quality of service for real-time services. RTP simply provides functionality suited for carrying real-time content, e.g., a timestamp and control mechanisms for synchronizing different streams with timing properties. RTP can be used over either connectionless networks, such as UDP/IP, or connection-oriented networks, such as XTP, ST-II, or ATM (AAL3/4, AAL5).

When RTP is used to transport real-time data over IP networks, the transmission of data between network endpoints (source and destination) is accomplished by establishing RTP stream(s) between the interested parties. An RTP stream can be defined as a one-directional stream of data from a given source to a given destination, characterized by source and destination attributes: source IP address, source UDP port, destination IP address, and destination UDP port. These attributes uniquely identify a particular RTP stream. An RTP session can be made up of one or more RTP streams between two or more participants.

The destination address/port pair may be the same for all participants, as in the case of IP multicast, or may be different for each participant, as in the case of individual unicast network addresses. In a multimedia session, each type of media is carried in a separate RTP stream. The multiple RTP streams can be distinguished by their different UDP port number pairs and/or different multicast addresses.

RTP sessions can be dynamically established through the signaling domain in the context of a running real-time application, such as Voice over IP (VoIP), IPTV, or gaming. Through signaling, the attributes (source and destination IP-addresses, and source and destination UDP-ports) of the RTP streams are exchanged between source and destination endpoints.

For example, in a VoIP application with Session Initiation Protocol (SIP) signaling, RTP stream attributes for an audio stream between a caller and callee can be exchanged through SIP signaling. Specifically, by the caller and callee informing each other of what IP address, and UDP port must be used for the RTP stream.

Therefore, in accordance with the prior art, a third party device trying to detect a given RTP stream in a network, must have visibility into the application level signaling and extract the RTP attributes. Without the RTP attributes, the third party device cannot easily detect RTP packets belonging to a particular RTP stream from amongst other UDP packets in the network. For this reason, typical prior art systems designed to detect RTP streams in networks, parse the signaling domain to identify attributes of the RTP streams on the network, and then, based on the identified attributes search for the RTP streams.

Identifying attributes of RTP sessions by monitoring application signaling can be problematic and inefficient. First, there is a race condition between the discovery of RTP attributes (by monitoring the application signaling), and the start of RTP streams. Typically, RTP streams start immediately after the application signaling occurs. It can be very difficult to ensure that no RTP packets are missed, prior to the detection of RTP streams. Second, in IP networks there can be widespread deployments where signaling, and RTP streams flow on different and separate paths within the network. In such scenarios, visibility into both signaling sessions and media streams (i.e. RTP streams) may not be practical.

In the prior art, there are two methods to overcome those challenges. The first method is to capture all UDP packets in a network, and post-process them by using visibility into the signaling of the application. This method avoids the race condition, but fails to address the scenario in which visibility may be impractical, because the signaling sessions and RTP streams may be on different and separate paths within the network. Furthermore, capturing all UDP packets in a given network typically is impractical, due to CPU processing and storage limitations.

The second method is a simple method that attempts to detect RTP streams based on two constant fields within an RTP header as defined by the RTP specification. An example of such a prior art method is the Ethereal Open Source Project (www.ethereal.org), which uses version number and payload type RTP header fields of a RTP packet for identifying that packet as part of an RTP stream. However, this second method is relatively inaccurate for RTP stream detection, and is marginal at best.

Accordingly, it would be advantageous to provide a system and method that can accurately detect RTP streams. It is an object of the present invention to substantially overcome the above-identified disadvantages and drawbacks of the prior art.

SUMMARY OF THE INVENTION

The present invention, in one embodiment, provides a method and system for identifying UDP packets on a UDP/IP network that are candidates for characterization as a packet of a RTP stream. The method includes identifying UDP packets at a point on the UDP/IP network, and for each identified UDP packet 1) determining if a version number in a static RTP header field in the payload of the UDP packet equals a predetermined value, 2) determining if a packet length associated with the UDP packet is within a predetermined range, and 3) determining if the payload type RTP header field, in the payload of the UDP packet, is within a predetermined range. If all the criteria are satisfied, then the identified UDP packet is characterized as a candidate RTP packet that is part of a RTP candidate stream.

In another embodiment, the present invention further provides that for each identified candidate RTP packet characterized as a part of a RTP candidate stream, determining from a source IP address, a destination IP address, a source UDP port, and a destination UDP port of the candidate RTP packet, if the packet is associated with a previously identified RTP candidate stream, or is associated with a newly identified RTP candidate stream. For candidate RTP packets associated with a newly identified RTP candidate stream, storing the synchronization source (SSRC), sequence number, and timestamp RTP header field values of the identified UDP packets.

In another embodiment, a method of the present invention further provides that for candidate RTP packets associated with a previously identified RTP candidate stream, determining the SSRC, sequence number, and timestamp from the RTP header fields in the payload of the identified UDP packets. Comparing the determined SSRC, sequence number and timestamp with the stored SSRC, sequence number and timestamp of a previously identified RTP candidate stream. If a predetermined number of RTP packets are received for a candidate RTP stream, a signal is generated denoting that candidate RTP stream is an actual RTP stream.

In another embodiment, the present invention provides a method of detecting types of data streams on a network based on the length of the packet. The method includes receiving a plurality of packets of at least one data stream, accessing application information associated with the received packets, detecting size (length) of at least some of the received packets based on the application information, and using the detected size to identify the type of data stream.

In an embodiment, a method of the present invention further includes detecting header field values (in the IP, UDP, and RTP packet header fields) of the received packets and using the header fields in combination with size to identify data streams. The header fields can include at least one or more of version number, payload type, source IP address, source UDP port, destination IP address, destination UDP port, SSRC number, sequence number, and timestamp.

In another embodiment, a method of the present invention further includes detecting packet spacing between the received packets and using the packet spacing in combination with size and header fields to identify data streams.

In another embodiment, the present invention provides a system of detecting types of data streams on a network based on the length of the packet. The system includes a receiver processor that receives a plurality of packets of at least one data stream, a data processor that accesses application information associated with the received packets, a detector processor that detects size of at least some of the received packets based on the application information, and an identifier processor that uses the detected size to identify the type of data stream.

In an embodiment of the present invention, a system further includes a detector processor for detecting header field values (in the IP, UDP, and RTP packet header fields) of the received packets and using the header field values in combination with size to identify data streams. The header fields can include at least one or more of version number, payload type, source IP address, source UDP port, destination IP address, destination UDP port, SSRC number, sequence number, and timestamp.

In another embodiment, the detector processor can also detect packet spacing between the received packets, and utilize the packet spacing in combination with size and header field values to identify data streams.

DESCRIPTION OF SPECIFIC EMBODIMENTS

The present invention, in one embodiment, provides an improved system and method for accurately identifying RTP streams in an IP network. The present invention does not utilize analysis of signaling associated with an RTP stream, and can operate without knowledge of, or reliance on, the application generating the RTP stream. Advantages of the invention over the prior art are that it can achieve highly accurate detection of RTP streams, and it avoids relatively high CPU and storage costs. A commercial application of the present invention can include live monitoring of RTP streams for performance monitoring, network usage capture, or use-behavior monitoring.

Figure 1:
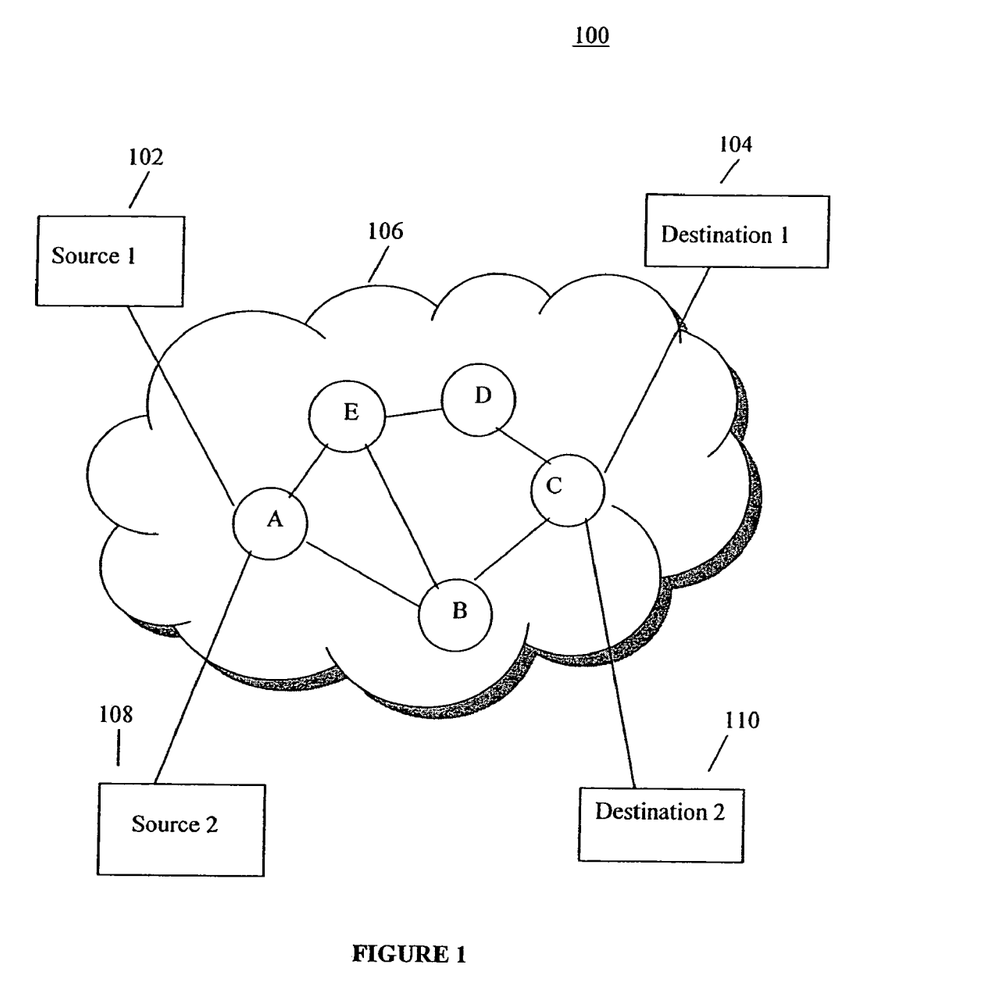
FIG. 1 illustrates the major components of a packet communications system that employs a method and system in accordance with principles of the present invention.

The block diagram of FIG. 1 depicts a packet communications system 100 that employs a system and method for identifying RTP streams in accordance with the principles of the present invention. One or more data sources 102, 108 can communicate with one or more data destinations 104, 110 by sending packets of data through a network of routers 106.

The data packets from one or more data sources 102, 108 may be interleaved, and can include real-time media data, such as video, or audio. In this illustrative example only five routers A, B, C, D, and E, are shown. As is known in the art, there may be hundreds of routers in a network and a packet may traverse dozens of routers on its way from a source to a destination. Routers maintain routing tables that allow them to pass packets from router to router and, eventually, to a destination.

Figure 3:
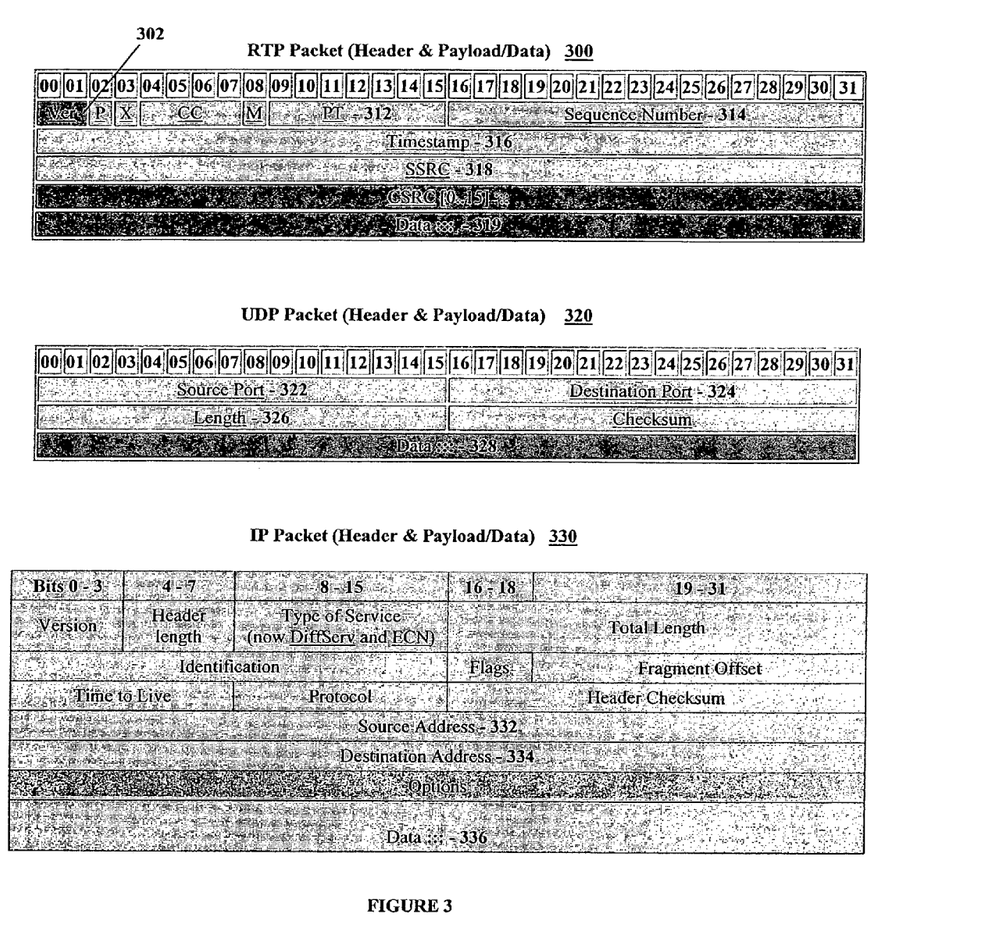
FIG. 3 illustrates key components and fields of an RTP packet, UDP packet, and IP packet such as may be characterized, and utilized by an embodiment of the present invention.

Each data packet contains a packet header that, depending on protocol, includes a plurality of fields that can be used in routing and identifying the data packets. Typically, RTP transports real-time data, such as voice and video, across networks. FIG. 3 illustrates 1) a RTP packet 300, its corresponding header fields, and its payload (data) 319, 2) a UDP packet 320, its corresponding header fields, and its payload/data 328, and 3) an IP packet 330, its corresponding header fields, and its payload/data 336.

Figure 4:
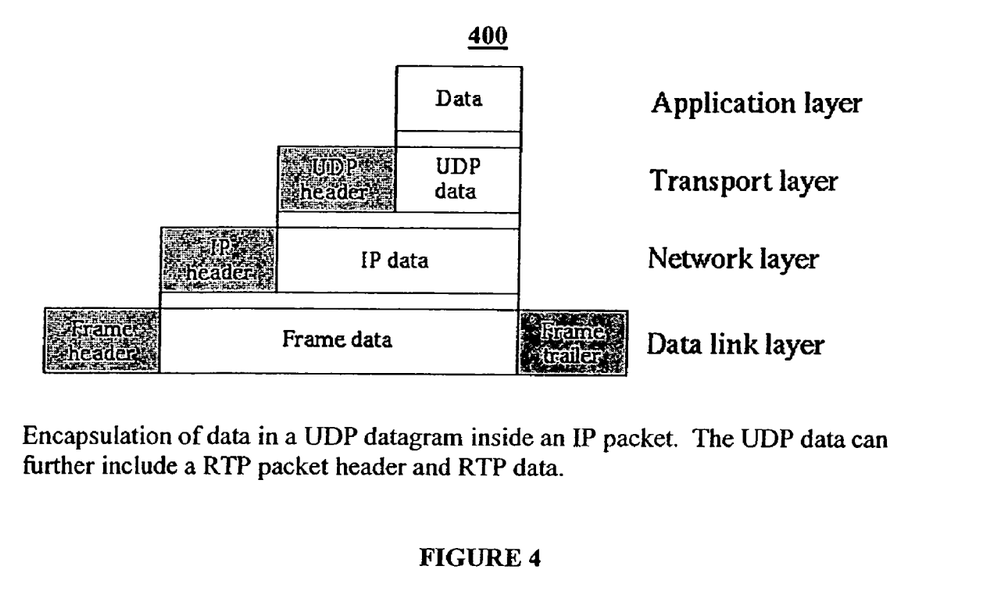
FIG. 4 illustrates the encapsulation of a RTP packet in a UDP datagram inside an IP packet during transport in accordance with principles of the present invention.

At the outset and with reference to FIG. 3 and FIG. 4, it should be appreciated that during transport, a RTP packet (header and payload) 300, is entirely encapsulated within the payload 328 of a UDP packet 320. In turn, the UDP packet 320 is entirely encapsulated within the payload 336 of an IP packet 330. In accomplishing its objectives, the present invention extracts and utilizes header field values from the RTP packets 300, UDP packets 320, and the IP packets 330.

Figure 2:
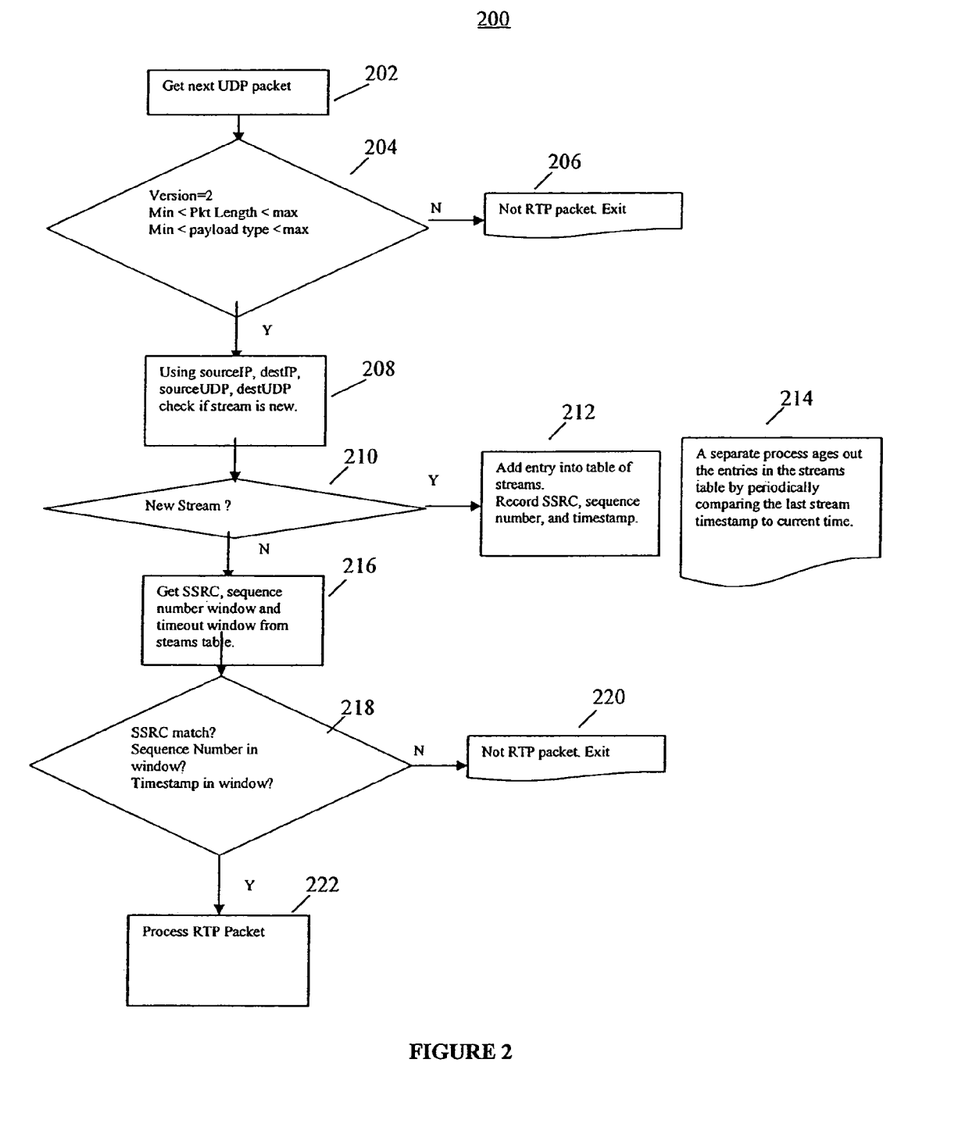
FIG. 2 is a flowchart that illustrates a method by which an embodiment of the present invention may identify a RTP stream.

With reference to FIG. 2 and to FIG. 3, the present invention provides, in one embodiment, a method 200 of capturing UDP packets at a point in the network, and utilizing a variety of criteria to detect if the UDP packets contain RTP data that belongs to an RTP stream. The criteria include assessing one or more real-time intrapacket and interpacket characteristics, in addition to examining two, three or more static header field values. Specifically, in one embodiment, the criteria utilized by the present invention can include the length 326 (size) of UDP packets, and the temporal spacing between successive captured UDP packets, as well as, two or more of a version number 302, payload type 312, sequence number 314, timestamp 316, and synchronization source (SSRC) 318 values from the RTP packet header 300, in the payload 328 of captured UDP packets 320. The present invention can assess these criteria, in combinations to determine if any given captured UDP packet is a candidate for characterization as a packet of an RTP stream, and eventually identify the packets which form an RTP stream.

In operation, the method 200, as a first step 202, captures one or more UDP packets 320 at a particular point in a network. Some or all UDP packets 320 can be captured and evaluated in real-time. For example, in step 204 the header fields of RTP packets 300 and UDP packets 320 are accessed and examined. In the illustrated embodiment, in step 204, the version number 302, packet length 326, and payload type 312 header fields are evaluated to determine if the values are consistent with predetermined values or ranges of values for RTP streams.

In the illustrated embodiment, the version number 302 is a value in a single bit field, for example 2 (since current RTP specification version 1 is obsolete and RTP version 2 is not backward compatible). However, it should be noted that in the future this value may change due to updates in the RTP specification. The payload type 312 is a 7 bit field that identifies the format of the RTP payload 319. A conventional default static mapping of payload type codes can be used to represent various payload formats.

The payload type 312 is not necessarily static for a RTP packet 300 because payload type codes can be defined dynamically. Dynamic payload types are typically used to map an RTP payload type to an audio, or video encoding for the duration of a particular session. Different participants of a session could use different mappings. Typically, dynamic payload types are in a range 96 to 127. Those codes are assigned outside of the RTP specification, including through the use of Session Description Protocol (SDP) and signaling such as SIP. For this reason, payload type 312 is not relied upon exclusively for determining whether a data packet is part of an RTP stream.

The packet length 326 refers to the length (or size) of a UDP packet 320, and is used in identifying candidate RTP packets 300. The payload length for audio packets are typically less than 320 bytes, and for video packets are typically in a limited range around 1500 bytes. UDP packets 320 having lengths within such predetermined ranges, are candidates for identification as RTP packets 300 belonging to a particular RTP stream.

Similarly, packet spacing between successive UDP packets 320 is also used. UDP packet spacing for audio data is typically from about 10 ms to about 50 ms, and for video data is under approximately 10 ms. UDP packets 320 having spacing within such ranges are candidates for identification as RTP packets 300 belonging to a particular RTP stream.

In the exemplary embodiment of FIG. 2, if the values for version number 302, packet length 326, and payload type 312 are incorrect or not within predetermined ranges, the particular UDP packet 320 under test is rejected as a candidate for an RTP stream (in step 206). The method 200 then restarts from step 202 for the next captured UDP packet 320. However, if the values are correct, or within the predetermined ranges, then the UDP packet 320 under test is characterized as a likely RTP packet 300. In step 208, for each identified candidate RTP packet 300, session attributes (source IP address 332, source UDP port 322, destination IP address 334, and destination UDP port 324) are extracted from the IP and UDP packet headers 330, 320. The extracted session attributes are then evaluated in step 210 to ascertain if the candidate RTP packet 300 is part of a previously identified RTP stream (if it has the same attributes), or part of a possible newly identified RTP stream (if it has different attributes).

In step 212, a packet ascertained to be part of a possible newly identified RTP stream is added into a data store, such as a file, table, database, etc. Specifically, in this exemplary embodiment. SSRC identifier 318, sequence number 314, and timestamp 316 RTP header field values are recorded in the data store for future reference and comparison to corresponding fields of other candidate RTP packets 300. A separate process 214 operates in the background to time out the entries in the data store, and clear the data store of the timed out stream information to reduce the storage/processing burden posed by candidate RTP packets 300, which are never determined to be part of an actual RTP stream. The time-out clearance function is accomplished, for instance, by periodically comparing the timestamp 316 of the candidate RTP packets 300 in the data store to the current time.

The SSRC 318 is a 32 bit identifier carried in the header of a RTP packet 300. For a true RTP packet 300, the SSRC identifier 318 identifies to which RTP stream the particular RTP packet 300 belongs. The SSRC 318 identifies a synchronization source of a stream of RTP packets 300. For example, the source of a stream of packets may be a signal source such as a microphone or a camera, or an RTP mixer. The SSRC identifier 318 can be a randomly chosen value meant to be globally unique within a particular RTP session. In other words, no two synchronization sources within the same RTP session should have the same SSRC 318. If a participant generates multiple data streams in one RTP session, for instance from separate video cameras, each can be identified as a different SSRC 318.

The sequence number 314 is a 16 bit field that increments by one for each packet sent in an RTP stream. The sequence number 314 may be used by a receiver to detect packet loss and to restore proper packet sequence. The initial value of the sequence number 314 can be a random value.

The timestamp 316 is a 32 bit field that reflects the sampling instant of the first octet in a data packet of an RTP stream. The timestamp 316 can be used to place the incoming audio or video packets in the correct timing order. The sequence number 314 can be used to detect losses. Sequence numbers 314 increase by one for each packet transmitted in an RTP stream. The timestamp value 316 may be the same for two or more successive packets, where the payload data for those packets is associated with a common reference time. For example, in video formats a video frame (referenced to a simple "frame time") may be split across several packets and several packets would have the same timestamp value 316. However, each RTP packet 300 would have a different sequence number 314 so that a proper sequence for the packets can be determined at a receiver.

A candidate RTP packet 300 ascertained not to be part of a new RTP stream, is processed as depicted in steps 216 and 218, by comparing the RTP packet header fields to previous entries in the data store 212. Specifically, the packet header fields SSRC identifier 318, sequence number 314, and timestamp 316 of that candidate RTP packet 300 are compared to previously stored SSRCs, sequence numbers, and timestamps of previous candidate RTP packets 300, to determine whether the current candidate RTP packet 300 is part of a previously identified RTP stream. If the SSRC identifier 318 matches an SSRC identifier 318 of a previously recorded candidate RTP packet 300, then both RTP packets 300 are determined to be part of the same RTP stream. The sequence numbers 314 and timestamps 316 are then compared to the previous entries to determine whether the packet sequence is within sequence number constraint parameters, and the packet arrival is timely and within timeout constraint parameters. This feature is implemented, for instance, as a state machine that detects out of order, lost, and increasing sequence numbers in a sliding window.

In step 220, if the SSRC identifier 318 does not match a previously recorded SSRC identifier 318 in the data store, or if the sequence number 314 is not within sequence number window constraints, or if the timestamp 316 is not within time constraints, then the candidate RTP packet 300 is rejected as a candidate packet for an RTP stream. The method 200 then restarts from step 202 for the next captured UDP packet 320. However, if the SSRC identifier 318 do match and the sequence number 314, and timestamp 316 are within the sequence number constraint parameters and timeout constraints, then the candidate RTP packet 300 is considered to be a packet in an RTP stream, and in step 222, is further processed as desired. The method 200 then repeats from step 202 for the next captured UDP packet 320.

It should be noted that the above sample embodiment is only one example of the present invention. The present invention can be implemented in a variety of embodiments, and can assess RTP candidacy based on parameters of the above cited criteria, in any combination, to detect and identify RTP sessions.

To summarize, the method and criteria that an embodiment of the present invention can utilize to identify RTP streams includes:
1. Examining the version number 302 header field of the RTP packet 300.
2. Monitoring the length 326 header field of UDP packets 320.
3. Examining the payload type 312 header field of the RTP packet 300.
4. Examining sequence number 314 and timestamp 316 header fields of the RTP packet 300.
5. Monitoring packet spacing of UDP packets 320 on the network.
6. Examining the SSRC 318 header field of the RTP packet 300.

The criteria are listed here in order of priority, and can be used in various combinations to identify RTP streams. Various combinations yield different levels of accuracy in RTP stream detection. For example, embodiments of the present invention that utilize the following combinations of the above-cited criteria can expect to achieve the following results in RTP stream detection.

Combination of 1, 2 yields over 90% accuracy in identification of RTP streams.

Combination of 1, 2, 3 yields over 95% accuracy in identification of RTP streams.

Combination of 1, 2, 3,4 yields over 99% accuracy in identification of RTP streams.

Combination of 1, 2, 3, 4, 5 yields near 100% accuracy in identification of RTP streams.

Combination of 1, 2, 3, 4, 5, 6 yields near 100% accuracy in identification of RTP streams.

A software implementation of the above described embodiment(s) may comprise a series of computer executable instructions either fixed on a tangible medium, such as a computer readable medium, e.g. diskette, CD-ROM, ROM, or fixed disc, or transmittable to a computer system, via a modem or other interface device, such as communications adapter connected to the network over a medium. The medium can be either a tangible medium, including but not limited to, optical or analog communications lines, or may be implemented with wireless techniques, including but not limited to microwave, infrared or other transmission techniques. The series of computer executable instructions embodies all or part of the functionality previously described herein with respect to the invention.

Those skilled in the art will appreciate that such computer executable instructions can be written in a number of programming languages for use with many computer architectures, operating systems, or protocols. Further, such computer executable instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer storage readable medium may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be apparent to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results.

Processes illustrated through the use of flow charts may not be strictly linear processes and alternative flows may be implemented within the scope of the invention. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. The invention may be embodied in other specific forms without departing from the spirit or essential characteristics thereof. It is intended that the scope of the invention be limited only by the claims appended hereto.

We claim:

1. A method for identifying UDP packets on an IP network which are candidates for characterization as a RTP packet of a Real Time Transport Protocol (RTP) stream, each of said UDP packets having a UDP header and a payload, wherein the payload potentially includes a RTP packet having a RTP header and a RTP payload, comprising the steps of:
   identifying UDP packets at a point on said IP network, and for each identified UDP packet performing the substeps of:
   i. determining if a version number value in said RTP header located in the payload of said identified UDP packet equals a predetermined value, and
   ii. determining if the packet length in said identified UDP packet header is within a predetermined range, and
   if said determining substeps are affirmative, then characterizing said identified UDP packet as a candidate RTP packet of an RTP stream, determining from said candidate RTP packet header: a payload type, a SSRC, a sequence number, and a timestamp, comparing said determined SSRC, sequence number, and timestamp with a stored SSRC, a stored sequence number, and a stored timestamp of previously identified RTP streams, and comparing said determined payload type with a stored payload type field of said previously identified RTP streams and at least one dynamic payload type associated with said previously identified RTP streams, and if there is a match in said comparison for one of said previously identified RTP streams, generating a signal associated with said candidate RTP packet denoting that said candidate RTP packet is a packet of said one previously identified RTP stream without regard to application level signaling associated with said one previously identified RTP stream.

2. The method according to claim 1, wherein said identifying step comprises the further substep of:
iii. determining if said payload type value in said RTP header field located in the payload of said identified UDP packet is within a predetermined range.

3. The method according to claim 2 comprising the further steps of:
for each candidate RTP packet, determining from a source IP address, a destination IP address, a source UDP port, and a destination UDP port, associated with said identified UDP packet, if said candidate RTP packet is associated with a previously identified RTP stream or is associated with a newly identified RTP stream, and
for each candidate RTP packet associated with a newly identified RTP stream, storing said SSRC, sequence number and timestamp of said candidate RTP packet in association with said newly identified RTP stream.

4. The method of claim 1, wherein the version number value is utilized in
combination with the detected size to identify streams.

5. The method of claim 1, wherein the version number value and the payload type value are utilized in combination with the detected size to identify streams.

6. The method of claim 1, wherein the version number value, the payload type value, the sequence number, and timestamp are utilized in combination with the detected size to identify streams.

7. The method of claim 1, comprising the further step of detecting packet spacing between the received packets and using the detected packet spacing in combination with the detected size and the header fields to identify streams.

8. The method of claim 1, wherein version number, the payload type, sequence number value, the timestamp value, and the detected packet spacing are utilized in combination with the detected size to identify streams.

9. The method of claim 1, wherein the version number value, the payload type value, the sequence number value, the timestamp value, the detected packet spacing, and the SSRC number value are utilized in combination with the detected size to identify streams.

10. The method of claim 1, comprising the further step of: for a detected stream, when the detected size of the packets is less than approximately 320 bytes, characterizing said stream as an audio data stream.

11. The method of claim 1, comprising the further step of: for a detected stream, when the detected packets have a packet spacing in the approximate range 10 ms to 50 ms, characterizing said stream as an audio stream.

12. The method of claim 1, comprising the further step of: for a detected stream, when the detected size of the packets is about 1500 bytes, characterizing said stream as a video stream.

13. The method of claim 1, comprising the further step of: for a detected stream, when the detected packets have a packet spacing less than approximately 10 ms, characterizing said stream as a video stream.

14. The method of claim 1, further including the sub-step of: determining the version number value.

15. The method according to claim 14, further including the sub-step of: determining if the payload type value in said packet header field is within a predetermined range.

16. The method according to claim 1, further including the sub-step of: determining if the temporal spacing of said packets relative to a packet previously identified on said network is within a predetermined range.

17. A system for identifying UDP packets on an IP network which are candidates for characterization as a packet of a Real Time Transport Protocol (RTP) stream, each of said UDP packets having a UDP header and a payload, wherein the payload potentially includes a RTP packet having a RTP header and a RTP payload, wherein each of said UDP packet headers includes a field for packet length corresponding to the size of said UDP packet, the system comprising:

an identification processor adapted to identify UDP packets at a point on said IP network, including characterization means operative on each identified UDP packet for:
i. determining if a version number value in said RTP header located in the payload of said identified UDP packet equals a predetermined value, and
ii. determining if the packet length in said identified UDP packet header is within a predetermined range, and if said determining substeps are affirmative, then characterizing said identified UDP packet as a candidate packet of an RTP stream, determine from said candidate RTP packet header: a payload type, a SSRC, a sequence number and a timestamp, compare said determined SSRC, sequence number and timestamp with a stored SSRC, a stored sequence number, and a stored timestamp of a previously identified RTP stream, compare said determined payload type with a stored payload type field of said previously identified RTP stream and at least one dynamic payload type associated with said previously identified RTP stream, and if there is a match in said comparisons for one of said previously identified RTP streams, generate a signal associated with said candidate RTP packet denoting that said candidate RTP packet is a packet of said one previously identified RTP stream without regard to application level signaling associated with said one previously identified RTP stream.

18. The system according to claim 17, wherein said identification processor further comprises the means operative on each identified UDP packet for:
iii. determining if the payload type value in said RTP header located in the payload of said identified UDP packet is within a predetermined range.

19. The system according to claim 18 wherein said identification processor is adapted to:
for each candidate RTP packet, determine from a source IP address, a destination IP address, a source UDP port, and a destination UDP port of said identified UDP packet, associated with said candidate RTP packet, if said candidate RTP packet is associated with a previously identified RTP stream or is associated with a newly identified RTP stream, and for each candidate RTP packet associated with a newly identified RTP stream, store said SSRC, sequence number and timestamp of said candidate RTP packet in association with said newly identified RTP stream.

20. A non-transitory computer storage readable medium comprising computer executable instructions for identifying UDP packets on an IP network which are candidates for characterization as a packet of a Real Time Transport Protocol (RTP) stream, each of said UDP packets having a UDP header and a payload, wherein the payload potentially includes a RTP packet having a RTP header and a RTP payload, the computer storage readable medium comprising computer executable instructions for:

identifying UDP packets at a point on said IP network, and for each identified UDP packet performing the substeps of:
  i. determining if a version number value in said RTP header located in the payload of said identified UDP packet equals a predetermined value, and
  ii. determining if the packet length in said identified UDP packet header is within a predetermined range, and
if said determining substeps are affirmative, then characterizing said identified UDP packet as a candidate packet of an RTP stream;

determining from said candidate RTP packet header: a payload type, a SSRC, a sequence number, and a timestamp, comparing said determined SSRC, sequence number, and timestamp with a stored SSRC, a stored sequence number, and a stored timestamp of previously identified RTP streams, and comparing said determined payload type with a stored payload type field of said previously identified RTP streams and at least one dynamic payload type associated with said previously identified RTP streams, and if there is a match in said comparison for one of said previously identified RTP streams, generating a signal associated with said candidate RTP packet denoting that said candidate RTP packet is a packet of said one previously identified RTP stream without regard to application level signaling associated with said one previously identified RTP stream.

21. The computer storage readable medium according to claim 20, wherein said computer storage readable medium further comprises computer executable instructions for:
  iii. determining if a payload type value in said RTP header located in the payload of said identified UDP packet is within a predetermined range.

22. The computer storage readable medium according to claim 21 further comprising computer executable instructions for:

for each candidate RTP packet, determining from a source IP address, a destination IP address, a source UDP port, and a destination UDP port of said identified UDP packet, associated with said candidate RTP packet, if said candidate RTP packet is associated with a previously identified RTP stream or is associated with a newly identified RTP stream, and for each candidate RTP packet associated with a newly identified RTP stream, storing said SSRC, sequence number and timestamp of said candidate RTP packet in association with said newly identified RTP stream.

* * * * *

UNITED STATES PATENT AND TRADEMARK OFFICE
CERTIFICATE OF CORRECTION

PATENT NO.           : 8,306,063 B2
APPLICATION NO.      : 11/511924
DATED                : November 6, 2012
INVENTOR(S)          : Muhammet Erdal and Kaynam Hedayat It is certified that error appears in the above-identified patent and that said Letters Patent is hereby corrected as shown below:

On the Title Page, Item (73):
Delete: "Assignee: EXFO Services Assurance, Inc., Chelmsford, MA (US)";
Insert: --Assignee: EXFO Service Assurance, Inc., Chelmsford, MA (US)--.

Signed and Sealed this
Twenty-second Day of January, 2013

David J. Kappos
*Director of the United States Patent and Trademark Office*